United States Patent [19]

Cieslak et al.

[11] 4,086,589

[45] Apr. 25, 1978

[54] AUDIBLE ELECTRONIC WARNING SYSTEM

[75] Inventors: Richard F. Cieslak, Algonquin; John V. Balding, Palatine, both of Ill.

[73] Assignee: Industrial Electronics Service Co., Schaumburg, Ill.

[21] Appl. No.: 776,184

[22] Filed: Mar. 10, 1977

Related U.S. Application Data

[60] Division of Ser. No. 664,434, Mar. 8, 1976, Pat. No. 4,075,625, which is a continuation-in-part of Ser. No. 550,219, Feb. 18, 1975, Pat. No. 3,981,007, which is a continuation-in-part of Ser. No. 377,644, Jul. 9, 1973, Pat. No. 3,889,256.

[51] Int. Cl.[2] .............................................. H04Q 3/10

[52] U.S. Cl. ............................. 340/384 E; 340/348 R

[58] Field of Search ........................ 340/384 E, 384 R

[56] References Cited

U.S. PATENT DOCUMENTS 3,747,092 7/1973 Smith .............................. 340/384 E

*Primary Examiner*—Harold I. Pitts

*Attorney, Agent, or Firm*—McWilliams & Mann

[57] ABSTRACT

This invention is an electronic siren producing a siren sound having a sound wave produced on a slowly rising and falling frequency. A major cycle is pulsed at intervals with variations in frequency. The variations in each major cycle represent minor cycles. The invention utilizes an electronic circuit to effect such major and minor frequency cycles with existing speaker equipment to project the sound. The electronic circuit includes one or more complex variable rate pulse oscillators wherein the variability of the oscillator is flexible so that it can be programmed internally, or controlled by the speed of the vehicle, or controlled by an operator, or dependent on other circuitry in the unit, or random. The present circuit has for its purpose to combine, superimpose, add, mix, or multiply, various signals from audio sweep oscillators in the circuitry including a plurality of such oscillators with the outputs thereof combined particularly by mixing means which includes multiplexing and simultaneous mixing as well.

8 Claims, 16 Drawing Figures

AUDIBLE ELECTRONIC WARNING SYSTEM

This application is a division of our copending application Ser. No. 664,434, filed Mar. 8, 1976, now U.S. Pat. No. 4,075,625 which was a continuation-in-part of our copending application Ser. No. 550,219, filed Feb. 18, 1975, now U.S. Pat. No. 3,981,007 which was a continuation-in-part of our application Ser. No. 377,644, filed July 9, 1973, now U.S. Pat. No. 3,889,256. The present invention is directed to electrical sirens and particularly to sirens of the type which may be used with emergency vehicles.

BACKGROUND OF THE INVENTION

Sirens commonly in use on emergency vehicles are of several types, i.e., as one utilizing a slowly rising and falling sound with a single or repetitive cycle, one using an alternating high and low frequency of sound or one using a slowly rising and falling sound frequency with minor sound frequency variations occurring during each cycle of the rising and falling sound. In the latter class of sirens, the sound has been produced by mechanical means. The first two types of sound producing sirens have heretofore been reproduced mechanically and electronically through use of motors or electrical amplifiers but, as far as is known, the third class has not heretofore been produced electronically. The mechanically produced siren noise has some desirable qualities not found in electronically produced siren sounds which may be attributed to purely mechanical noises resulting from the sound producing apparatus. Mechanically driven baffling is used with mechanical sirens to create a minor pulsing of the siren sound during each cycle of rising and falling frequency of the sound.

SUMMARY OF THE INVENTION

Electronically produced siren sounds have the advantages that sound emitting speakers of the siren may be located at various points in an emergency vehicle so that the sound direction may be predetermined. Electronically produced siren noises have the further advantage of utilizing combined, or existing amplifying apparatus in an emergency vehicle, thus reducing electrical power requirements in such vehicles. For example, the speakers used for producing a siren in the vehicle may also be used for a public address system.

OBJECTS OF THE INVENTION

With the foregoing in mind, the present invention has for its major purposes to provide an electronically produced siren sound which closely simulates the mechanically produced siren sound above mentioned and which produces a slowly rising and falling sound frequency with variations on the frequency during each cycle of rising and falling sound, and to enable use of such electronically produced sound with existing speaker facilities of emergency vehicles, while at the same time arranging simple and effective circuits to attain these ends at relatively low cost of manufacture and installation.

The invention has as a primary purpose to produce an electronically produced siren sound which simulates a plurality of siren sounds, both simple and/or complex, and thus has a greater effectiveness as a warning device and is compatible with existing equipment, using a single speaker, and which is practical to manufacture and install.

A more specific object of the invention includes a variable pulse oscillator in the circuitry wherein the variability of this oscillator is flexible to provide for its being programmed internally, or controlled by the speed of a vehicle, or operator controlled, or dependent on other circuitry in the unit, or random.

A further object of the invention is the provision of electronic circuitry for the development of siren sounds including a mixer or multiplexer in the circuit to combine, superimpose, add, mix, or multiplex, various signals from audio sweep oscillators in the circuitry.

An important object of the invention is to provide electronic circuitry for the development of siren sounds including a plurality of sweep oscillators with means to combine the output thereof utilizing mixing means which may include multiplexing as well as simultaneous mixing.

DESCRIPTION OF THE DRAWINGS

These and other purposes will appear from time to time in the course of the ensuing specification and claims when taken with the accompanying drawings, in which:

FIG. 3 is a sound wave diagram;

DESCRIPTION OF PREFERRED EMBODIMENT

Figure 1:
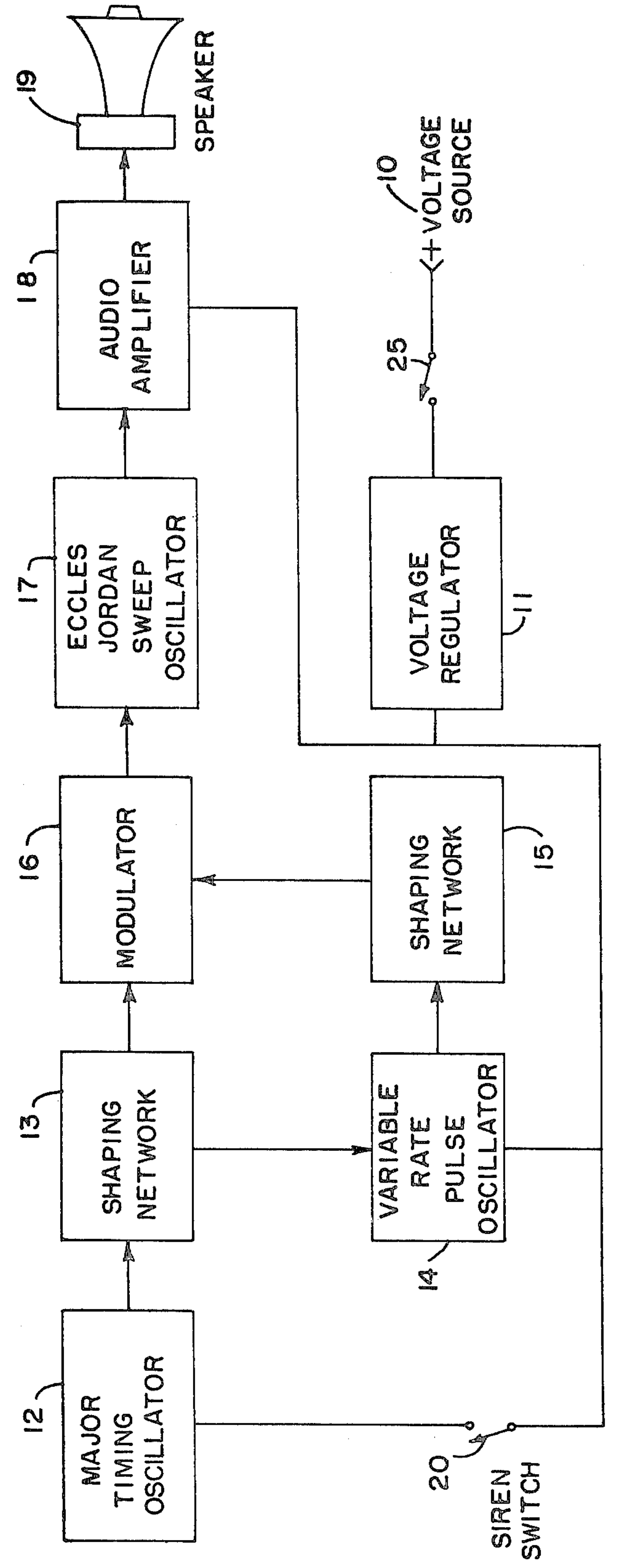
FIG. 1 is a block diagram of an electronic siren system in accordance with the present invention.

As shown in the drawings, the several elements of the siren system include a voltage source 10, a voltage regulator 11, a major timing oscillator 12, a shaping network 13, which supplies a variable pulse rate oscillator 14. A second shaping network 15 takes the frequency supplied by the oscillator 14 and supplies it to a modulator 16, which mixes the output from the shaping network 15 with the output from the shaping network 13 and supplies this mixed frequency to a sweep oscillator 17. Oscillator 17 supplies audio amplifier 18 for a speaker 19. A switch 20 controls the siren. The sweep oscillator 17 is powered from the voltage source 11 and is controlled by a bias voltage from modulator 16.

The sound generated by this electronic system is on a rising and falling frequency ranging from a peak frequency to a low frequency, requiring a time interval to reach the peak frequency and approximately the same interval to fall back to the low frequency. This varying frequency comprises a major cycle but is pulsed at a continuously varying rate and at peak frequency the pulse rate is at a maximum. Each pulse varies in frequency depending upon whether the major cycle is near the high or low end and each pulse comprises a minor cycle. This variably pulsed sound, as generated by this system, is obtained through the circuitry illustrated in more detail in FIG. 2. This sound is shown diagrammatically in FIG. 3. As an example, the basic sound may be a rising and falling frequency ranging from 400 to 1600 hertz. The sound takes approximately 3 to 5 seconds to reach the peak of 1600 hertz and the same time to fall back to the minimum. This is referred to herein as a major cycle. This varying frequency is then "pulsed" at a continuously varying rate. Near or at peak frequency, the pulse rate is at a maximum (approximately 200 cpm). These pulses shall be referred to as minor cycles. Each minor pulse varies in frequency approximately 100 to 200 HZ and in length approximately 0.3 to 0.6 seconds, depending on whether the major cycle is near the high or low end.

The sweep oscillator varies in output frequency with the bias voltage from modulator 16 so that as the bias voltage increases the output frequency of the oscillator also increases and when the bias voltage decreases the output frequency also decreases. The major timing oscillator 12 operates essentially like a switch, alternately turning on for a certain time period, as for example 3 to 5 seconds and then off for substantially the same period of time. The shaping network 13 functions to change the voltage switched on and off by the oscillator 12 to a slowly rising and falling voltage wave form similar to a sine wave. It converts the square wave form of approximately 3–5 seconds duration from oscillator 12 to a repetitive approximate sine wave of approximately the same duration. This voltage wave form provides a variable bias voltage for the sweep oscillator so that the output of the oscillator is a cyclically varying frequency of the same duration, i.e., approximately 6 to 10 seconds. This, in turn, provides a cyclically varying sound in the audio speaker of the same duration as illustrated in FIG. 3. The variable pulse rate oscillator 14 is supplied with the alternately rising and falling voltage from the shaping network 13 and varies its pulse rate proportionately, so that, as the voltage increases, the pulse rate also increases and when the voltage decreases the pulse rate also decreases. This varying pulse is then shaped and applied to the sine wave voltage form from shaping network 13 and the resultant mixed voltage wave form is applied to the sweep oscillator 17 in the form of the bias voltage so that the output of this circuitry provides the variable pulsing frequency which results in the particular sound of this siren system.

Figure 2:
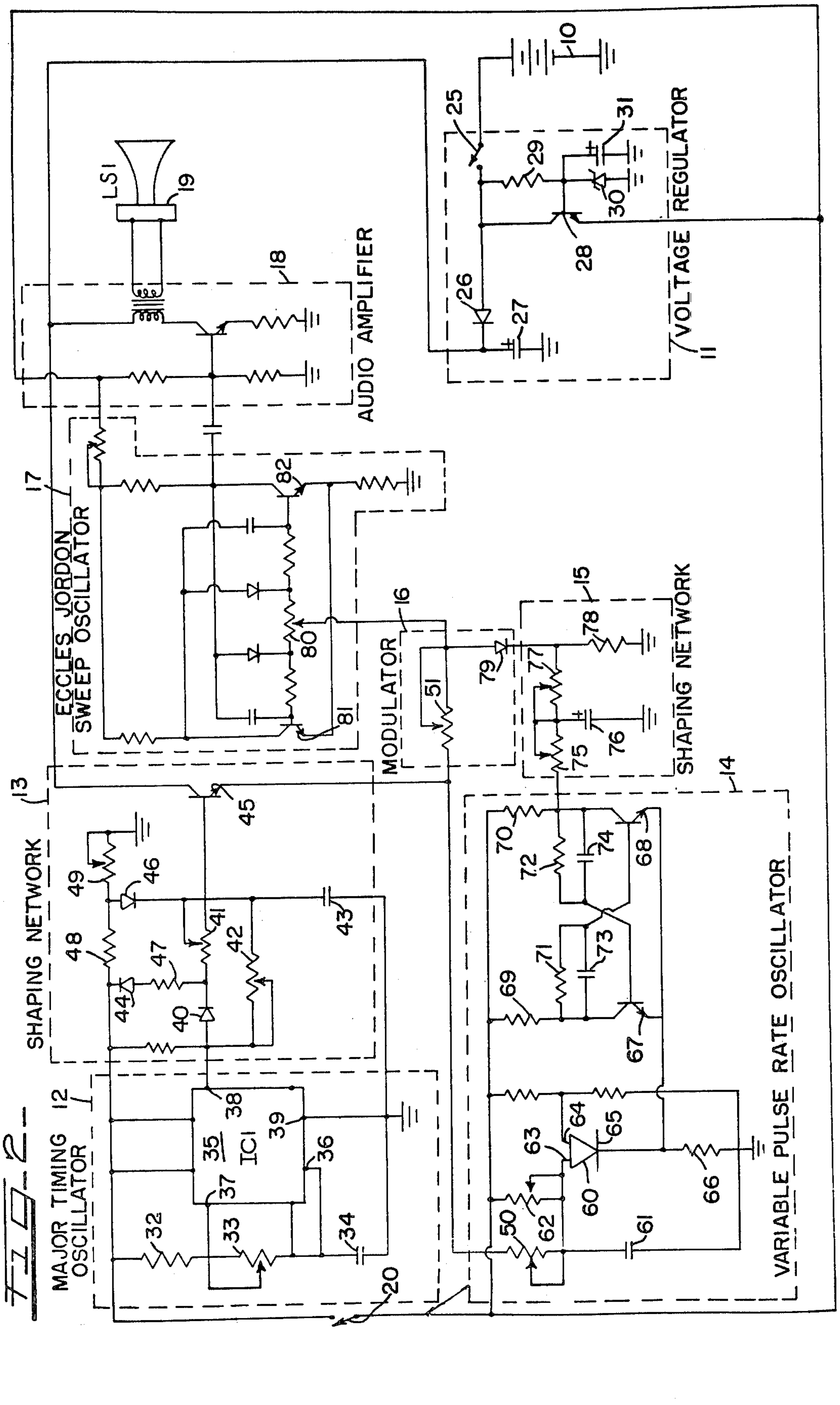
FIG. 2, is a schematic wiring diagram of the siren system showing the electrical relationship of all of the elements indicated in FIG. 1.

The schematic wiring diagram of FIG. 2 illustrates the details of the several elements which together function to operate the system and obtain the sound generated and controlled by this total circuit. The voltage regulator circuit 11 includes a switch 25 and, when this switch is closed, positive voltage is applied from battery 10 to the voltage regulator circuit. The diode 26, with the condenser 27 function as a filter while the transistor 28, resistor 29, diode 30 and condenser 31 function as a series regulator. Two D.C. supply voltages are made available from this voltage regulator circuit. A filtered voltage supplies the amplifier 18 and a transistor amplifier supply in shaping network 13 for modulator 16 and variable pulse rate oscillator 14. The regulated voltage provides power for oscillator 12, variable rate oscillator 14 and sweep oscillator 17.

The major timing oscillator circuit 12 is controlled by the on-off siren switch 20. When this switch is closed the regulated positive voltage from the regulator 11 is continuously applied to the timing oscillator. The resistors 32 and 33 and the condenser 34 form a timing circuit in conjunction with the timer 35. Timer 35 is a known form of timer for periodically discharging condenser 34. The condenser 34 is charged through the resistors 32 and 33 until the regulated voltage is reached at the connection 36 on the timer, whereupon the condenser 34 discharges through the resistor 33 into the timer at connection 37 until the voltage at the connection 36 drops to approximately one-third of the regulated voltage and at this point the condenser 34 again starts to charge and this cycle repeats continuously so long as the siren control switch 20 is closed. The output of the timer 35 at the connection 38 represents a square wave form, as indicated, which switches from the high voltage to the low voltage, i.e., from the regulated voltage to ground, through the connection 39. The square wave is of approximately 3 to 5 seconds duration.

The shaping network 13 includes a diode 40, resistances 41 and 42 and the condenser 43. When the output of the timer 35 through the connection 38 is at the high, or regulated voltage, the diode 40 is biased on the condenser 43 charges through the parallel resistors 41 and 42. When the timer output through connection 38 is at the low voltage, diode 44 is biased off so that the condenser 43 discharges through the resistor 42. Thus, there is provided at the base of transistor 45 a slowly rising and falling wave form wherein the duration is determined by the R-C time constant of the variable resistance 33 and the condenser 34 in the major timing oscillator circuit 12. Diodes 44 and 46, and resistors 47, 48 and 49, are used to provide smooth starting and termination of the rising and falling voltage. The collector of transistor 45 receives power from the filtered source of the regulator 11. The transistor 45 amplifies the current of the rising and falling wave form and applies it to the resistor 50 of the variable pulse rate oscillator circuit 14 and to the resistor 51 of the modulator circuit 16.

In the variable pulse rate oscillator circuit 14 a programmable unijunction transistor 60 is used. Condenser 61 is charged through the resistances 50 and 62. When charged, the voltage at the anode 63 of the transistor 60 increases until it reaches approximately 70% of the voltage at the gate 64 of the transistor. At this point transistor 60 turns on and discharges the condenser 61 through the cathode 65 of transistor 60 and resistor 66. As the voltage applied to the resistor 50 rises and falls, the charge time of the condenser 61 accelerates and slows down, respectively, so that the transistor 60 pulses at a varying rate. Each time the transistor pulses, a bistable multivibrator, comprised of transistors 67 and 68, resistors 69, 70, 71 and 72, and condensers 73 and 74, is energized. This provides a square wave of varying rate or duration at the collector of transistor 68. This wave is cyclic in nature and of a much shorter time duration than the wave form from network 13. Also, the range of the variation in voltage occurring during the wave is much smaller than the range of voltage variation produced in the major wave.

The shaping network 15 shapes the varying minor square wave from the transistor 68 of the variable pulse rate oscillator circuit 14, into a wave form which is similar to a triangular wave, at the junction on the resistor 75 and condenser 76 and then reduces it in amplitude through a voltage divider formed by resistors 77 and 78.

The shaped wave from the major timing oscillator circuit 12 and the shaping network 13 is applied to the resistor 51 of the modulator circuit 16 while the varying shaped wave from the variable pulse rate oscillator circuit 14 and shaping network 15 is applied to the cathode of the diode 79 of the modulator circuit. The resultant wave form at the junction of the resistor 51 and the diode 79 comprises essentially the minor varying wave from shaping network 15 imposed on the major timing wave from shaping network 13.

The mixed voltage form from the modulator circuit 16 is applied to the center tap of a resistor 80 in the sweep oscillator circuit 17, where it functions as a bias voltage for transistors 81 and 82. The output of the sweep oscillator at the collector of the transistor 82 increases in frequency as the bias voltage increases so that, as the slowly rising and falling variable pulsing wave form is applied to the sweep oscillator, the output frequency slowly rises and falls in synchronism with the rising and falling wave form from network 13 in synchronism with the minor wave form from shaping network 15 while continuously pulsing at a varying rate. The pulses occur most rapidly at the highest frequency and occur most slowly at the lowest frequency.

The audio frequency output of the sweep oscillator 17 is then amplified by means of one or more audio amplifiers 18, the circuitry of which, as shown, is generally typical of amplifiers of this type, and used to drive one or more speakers 19 whereby to project a slowly rising and falling variably pulsing sound continuously while turned on. The frequency range of the output from oscillator 17 corresponds in extent to the frequency range of the sound produced.

This electronic siren system has particular application to vehicles where the voltage source may be on the order of 12 volts, as provided in the usual automotive electrical system, but the principles of the system may be utilized with other voltages and in other installations where the location may be fixed, as distinguished from a moving vehicle.

It should be understood that voltage regulator circuits, timing oscillator circuits, wave shaping circuits, variable pulse rate oscillator circuits, sweep oscillator circuits, and audio amplifier circuits are known individually to the art but not in the combination or for the purpose herein described.

DESCRIPTION OF MODIFIED EMBODIMENTS

As shown in FIGS. 4 through 7, the invention contemplates modification of the circuitry to obtain additional sounds by changing or rearranging the circuitry to utilize the variable rate oscillator in various locations relative to other components in the organization, or by using a plurality of variable rate oscillators in the circuit either in parallel or in series to obtain the sounds or group of sounds desired. By utilizing electronically more complex pulse oscillators a greater number of sound sequences can be obtained without the necessity for the provision of any additional components.

Figure 4:
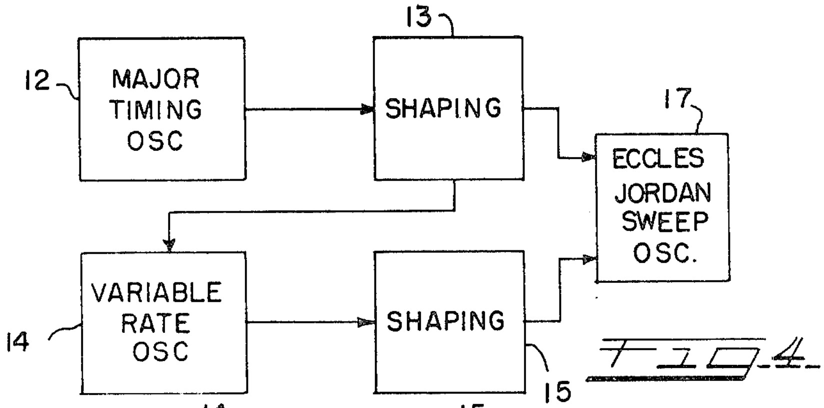
FIG. 4 is a block diagram of a modified version of the invention, wherein the modulator is eliminated.
Figure 5:
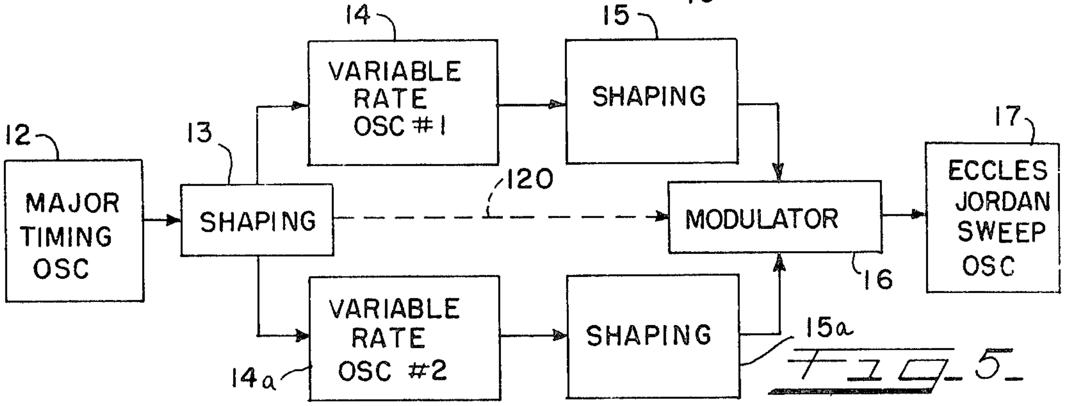

In the arrangement illustrated in FIG. 4, the modulator 16 of the previously described circuit arrangement has been eliminated. The modulator gave a great degree of control in combining two signal wave forms but this function now occurs internally in the sweep oscillator 17 without the use of a modulator. In the circuitry as shown in FIG. 4, the variable rate pulse oscillator 14 may incorporate a D.C. staircase generator to shift the D.C. control voltage to the Eccles Jordan sweep oscillator in staircase fashion or, it might incorporate a circuit similar to that of the previous circuit and function to mix the signals of the oscillators 12 and 14 at the input, or other points of the Eccles Jordan oscillator 17.

Figure 5:
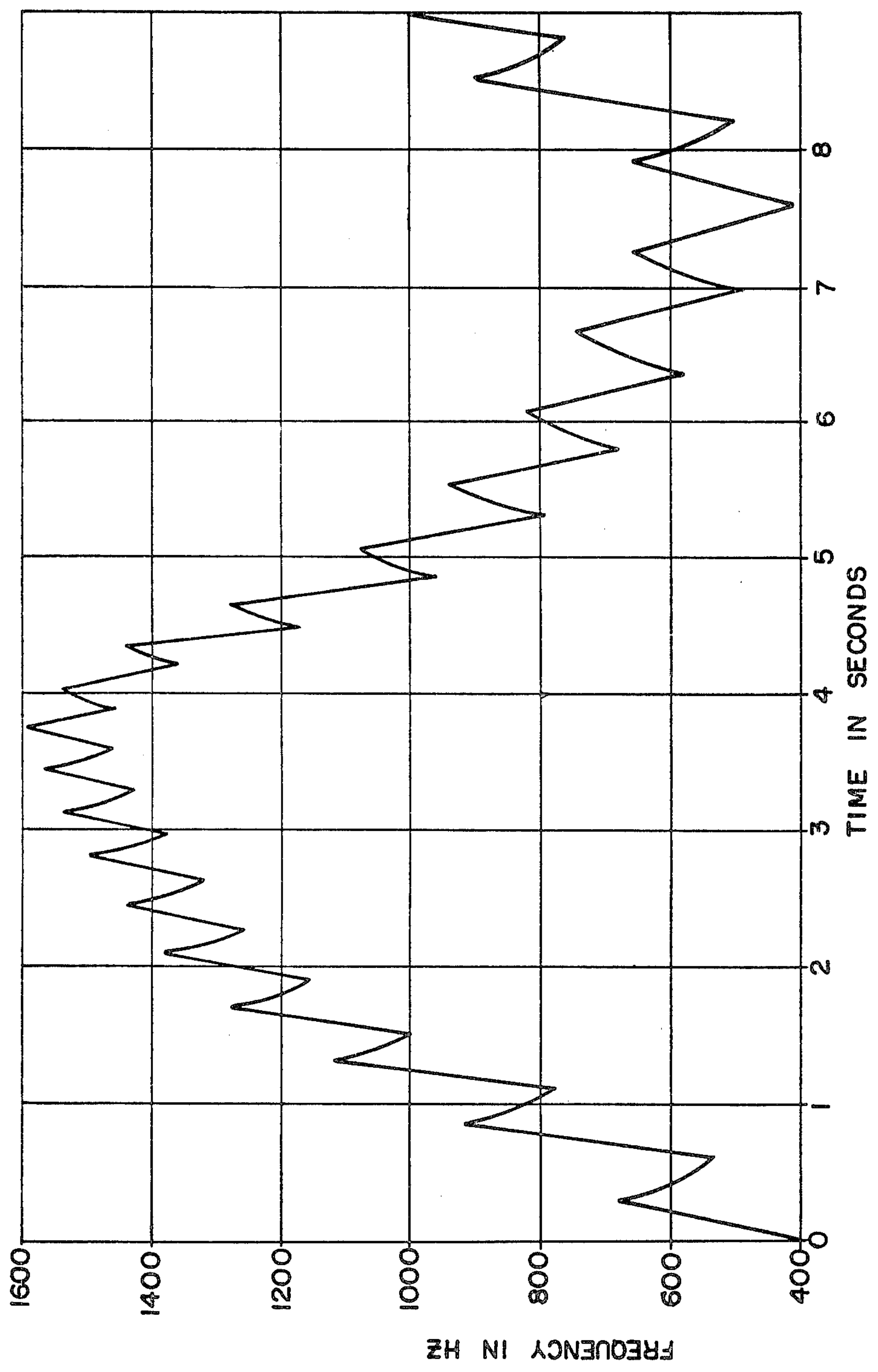
FIG. 5 is a block diagram of another modification of the invention wherein a plurality of variable rate oscillators are utilized in parallel.
Figure 6:
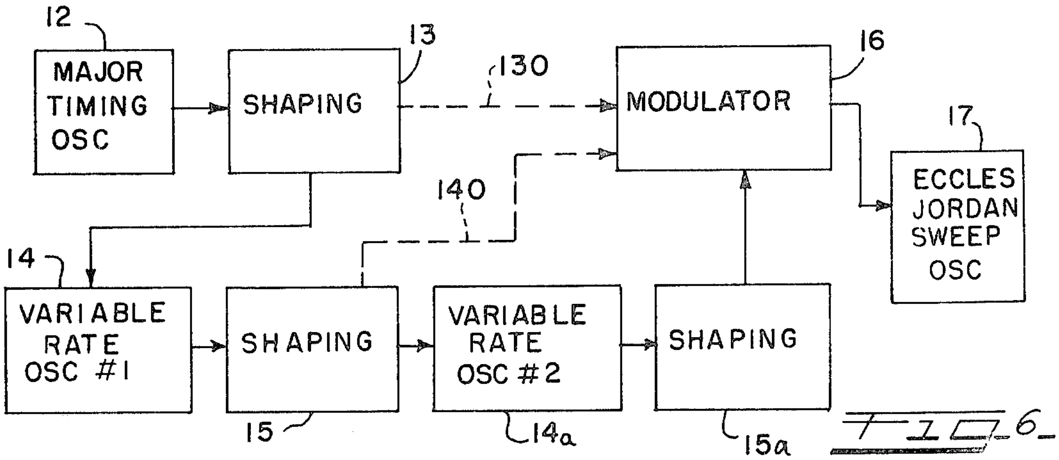
FIG. 6 is a block diagram of a further modification of the invention wherein a plurality of variable rate oscillators are incorporated in series.

FIGS. 5 and 6 illustrate the use of a plurality of variable pulse oscillators 14 and 14[a] whereby to obtain a more complicated wave form from the modulator 16. All of the signals may be combined in the modulator or in any combination of such signals. It is demonstrated here that the greater number of variable rate oscillators, such as 14 and 14[a], to be used the greater is the possibility to approach a random signal such as:

1. pulsing the major cycle wave at the same rate, either variable, or set.
2. pulsing the pulses of the major cycle wave form,
3. pulsing the pulses of the pulses of the major cycle wave form, etc.

The frequency of the reoccurrence of the sound sequence may be lengthened to a great extent by the use of this system. In the arrangement of FIG. 5, the variable rate oscillators 14 and 14[a] are disposed in the circuit in parallel while in FIG. 6 the variable rate oscillators 14 and 14[a] are disposed in the circuit in a series arrangement.

FIGS. 5 and 6 also include possible alternate or additional circuits to add further complexity to the sound sequence and make possible an improvement in the tone quality of the sounds. In FIG. 5 a possible alternate circuit arrangement is indicated by a circuit 120, shown in dotted lines, which connects the major timing oscillator 12 through the shaping network 13 with the modulator 16. The circuit arrangement of FIG. 6 may possibly be modified to provide alternate circuit variations by the provision of circuit 130, shown in dotted lines, which connects the major timing oscillator 12 through the shaping network 13 with the modulator 16 and a circuit 140, also shown in dotted lines, which connects the variable rate oscillator 14 through shaping network 15 with the modulator 16.

Figure 7:
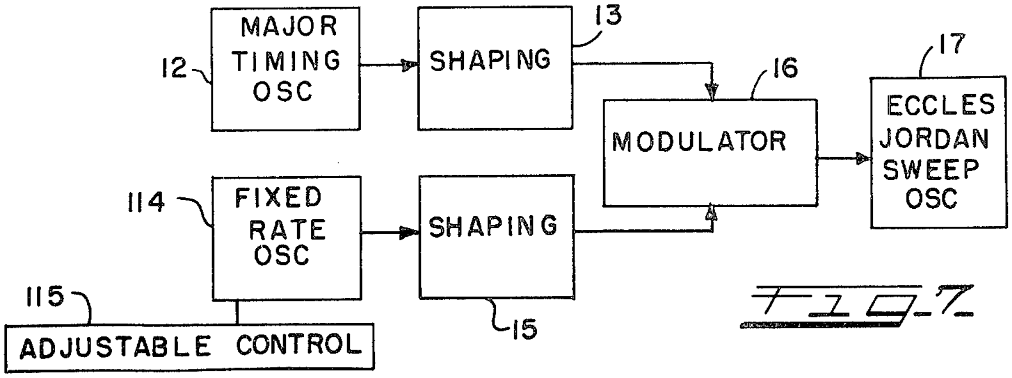
FIG. 7 is a block diagram of another version of the invention wherein an independent pulse oscillator is used and which is a fixed rate, or non-variable oscillator.

FIG. 7 illustrates the use of a fixed or adjustably fixed rate oscillator 114 in the siren circuit. This oscillator (minor) is such that the pulsing rate is non-varying and the timing thereof may be set to occur or to pulse the major cycle at any desired rate. The adjustability aspect may be multiple, although non-varying, it could be controlled by any external or internal means. A suitable adjustable control 115 is indicated in FIG. 7 in circuit with the oscillator 114. The fixed rate oscillator 114 and shaping network 15 may operate independently of the major timing oscillator 12 to provide a wave form, or voltage level at any timing sequence.

Figure 8:
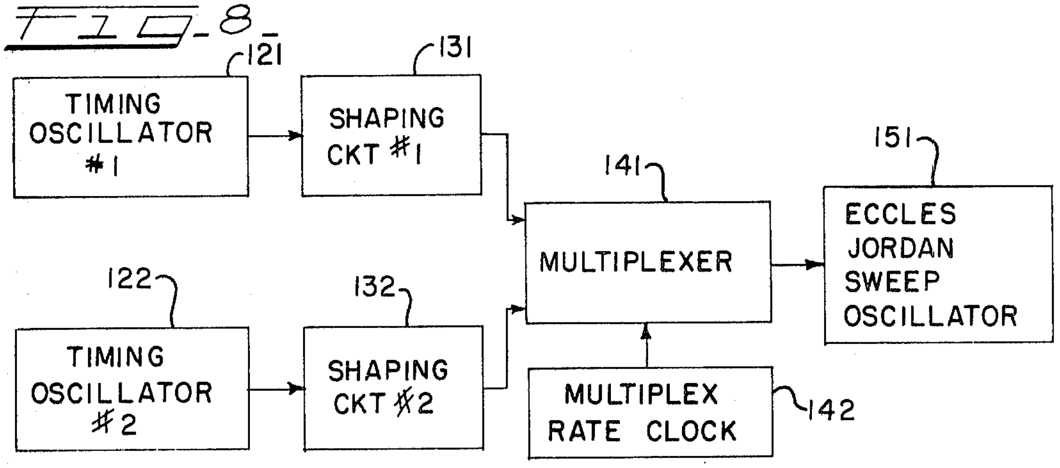
FIG. 8 is a block diagram of still another version of the invention wherein a multiplexer and a multiplex rate clock are utilized to combine the outputs of a plurality of independent timing oscillators and shaping circuits.

As shown in FIGS. 8 through 14, the invention incorporates modifications of the circuitry, or the addition of elements in combination therewith whereby to superimpose, combine, add, mix, or multiplex, the several signals from audio sweep oscillators in the circuit. As shown in FIG. 8, the circuit includes a first timing oscillator 12 and a second timing oscillator 122 as well as a first shaping network 131 and a second shaping network 132. A multiplexer 141 is in circuit with both of the oscillators 121 and 122 and with the shaping networks 131 and 132 and takes the output, or signals, therefrom and combines, adds, mixes, superimposes, or multiplexes, the various signals thus received. The thus mixed signals are applied to the input of Eccles Jordan sweep oscillator 151. This causes a simulated output of a plurality of different audio frequencies simultaneously.

In this arrangement a multiplex rate clock 142 is in circuit with the multiplexer 141 to control the rate of switching of the plural inputs and thus determine the speed or rate of the multiplexing action. The multiplexer 141 has the effect of switching the input from the shaping network 131 and the output from the shaping network 132 at the rate determined by the rate clock 142. The arrangement of FIG. 8 contains the two separate timing oscillators 121 and 122 and the two separate shaping networks are multiplexed, as described and the resultant wave form comprises the input to the Eccles Jordan oscillator 151. The multiplexer 151 therefore takes the place of the modulator sections of FIG. 4–7 with the end result represented by the output of the Eccles Jordan oscillator 151 being approximately the same whether a modulator is used or a multiplexer is utilized.

The several arrangements of FIGS. 9 through 14 all include a plurality of Eccles Jordan oscillators as distinguished from the single such oscillator of FIG. 8 and are all concerned with the mixing, or multiplexing, of a plurality of audio signals instead of D.C. wave forms. The various arrangements illustrated in these Figures all encompass the mixing, or multiplexing, of simple audio wave forms as well as complex audio wave forms, such complex audio waveforms derived from the circuits such as illustrated in FIGS. 4 through 7. Thus, the concept of modulating, or mixing, multiple shaped D.C. wave forms and controlling an Eccles Jordan sweep oscillator, with the resultant complex wave form, is capable of mixing, or multiplexing, of the complex audio outputs of multiple Eccles Jordan sweep oscillators by utilizing the circuits of FIGS. 9–14.

Figure 9:
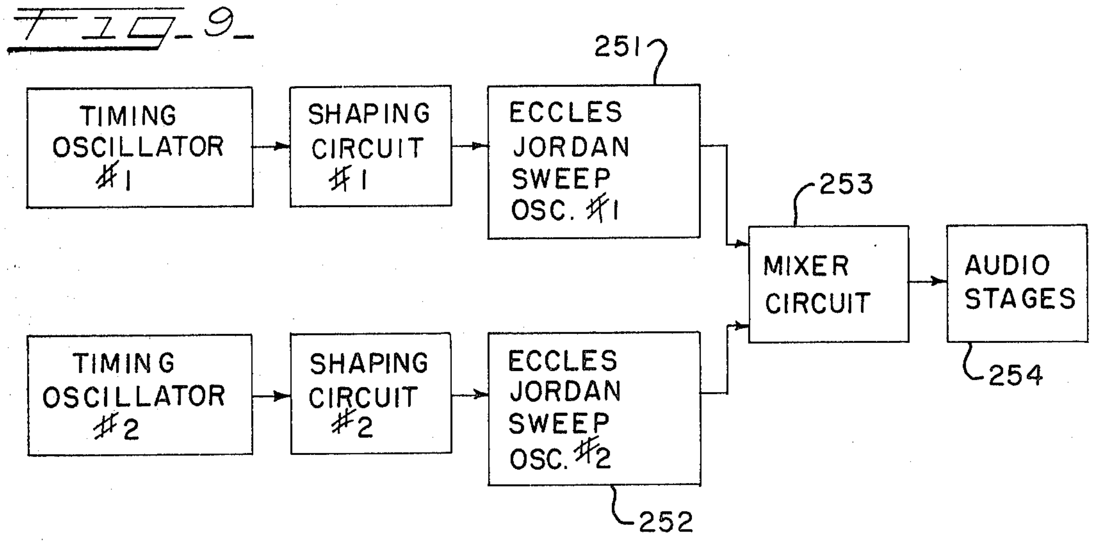
FIGS. 9 and 10 are block diagrams of further modifications of the invention wherein a plurality of Eccles Jordan sweep oscillators are included in the circuit and their outputs are combined in a mixing or multiplexing circuit.
Figure 10:
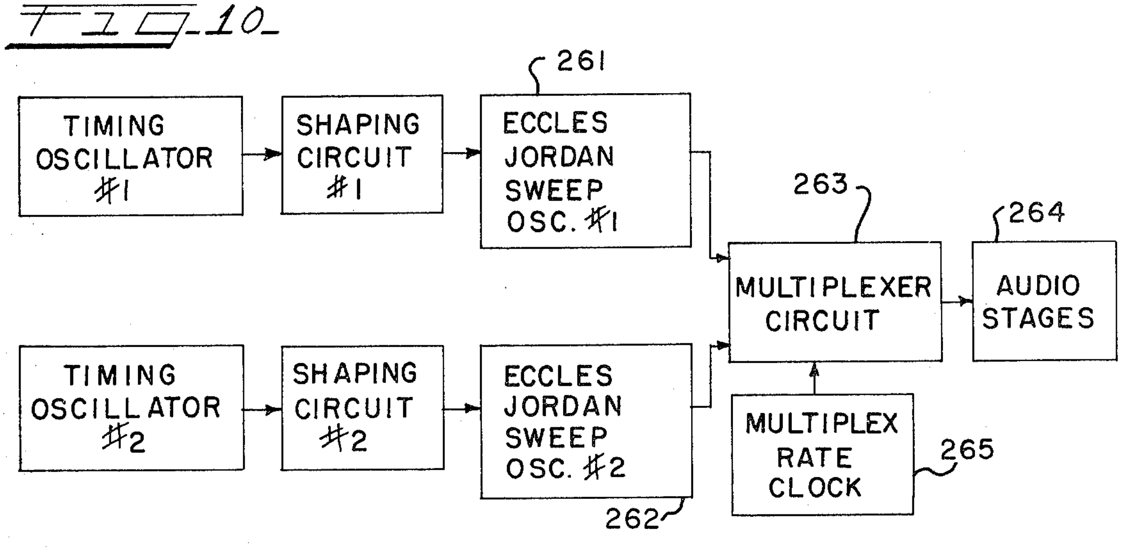

In the circuit arrangement of FIG. 9 a pair of Eccles Jordan oscillators 251 and 252 deliver their respective outputs to a mixer circuit 253 and thence to the audio stages 254. The circuit arrangement of FIG. 9 and that of FIG. 10 both handle a plurality of simple signals. In the circuit of FIG. 10 the Eccles Jordan sweep oscillators 261 and 262 deliver their outputs to a multiplexer circuit 263 and thence to the audio stages 264 with the rate of the switching of the inputs into the multiplexer being determined by a multiplex rate clock 265.

Figure 11:
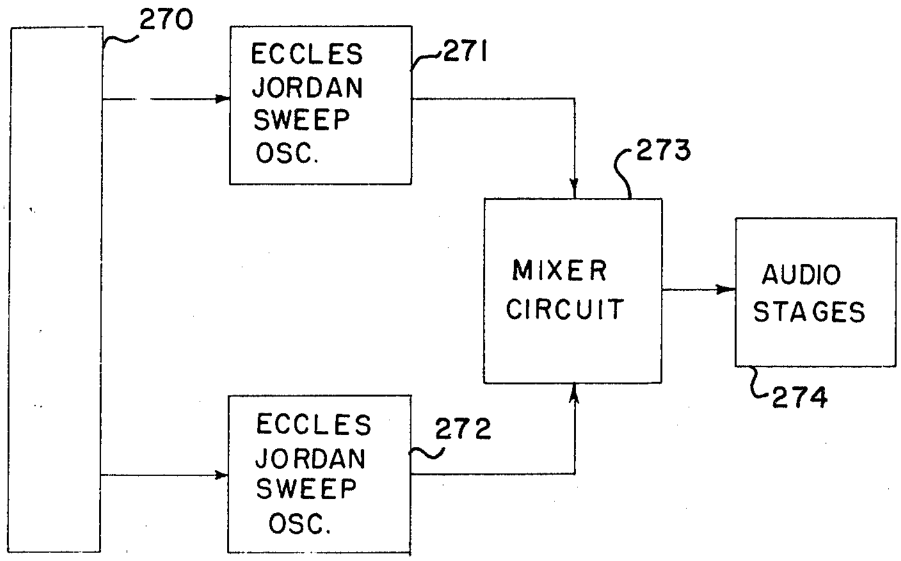
FIGS. 11 and 12 are block diagrams of further modified versions of the invention wherein the circuit arrangements of FIGS. 4 through 8 are adapted to be used in combination with a plurality of Eccles Jordan sweep oscillators and their associated circuitry in any arrangement thereof and their outputs combined in a multiplexer, or mixer, circuit.
Figure 12:
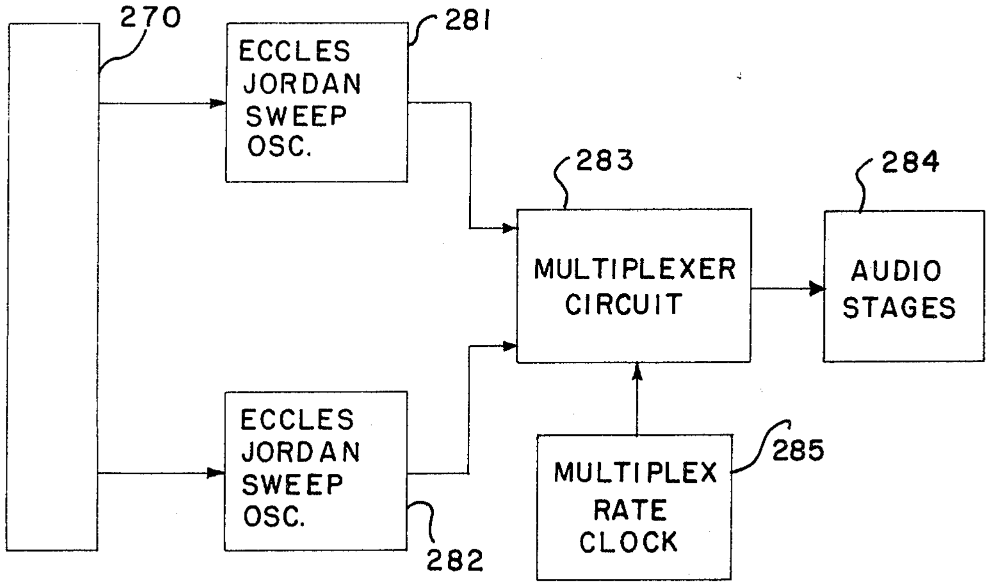

In FIGS. 11 through 14 the relatively large block illustration 270 represents the entire circuit diagram arrangements of the previous FIGS. 4 through 8 and shows that this multiplexer, or mixer concept may be combined with any one of the previously illustrated circuits to achieve the improvements and advantages of multiplexing. In the circuit arrangement shown in FIG. 11 the Eccles Jordn sweep oscillators 271 and 272 both receive the output from circuits each represented by anyone of the previously illustrated circuits 270 shown in FIGS. 4 through 8 and the oscillators 271 and 272 deliver their respective outputs to a mixer circuit 273 and thence to the audio stages 274. In this Figure the Eccles Jordan sweep oscillators 271 and 272 are counterparts to the oscillator 17 of FIGS. 4 through 7, or oscillator 151 of FIG. 8. Thus, while FIG. 11 is concerned with the mixing of a plurality of complex audio signals, the circuitry of FIG. 12 is concerned with the multiplexing of a plurality of complex audio signals.

In FIG. 12 the circuitry illustrated includes Eccles Jordan sweep oscillators 281 and 282, each receiving its input from the circuits comprised of any one of the previously illustrated circuits 270 of FIGS. 4 through 8 respectively, with these oscillators 281 and 282 delivering their outputs to a multiplexer circuit 283 and thence to the audio stages 284. The multiplexer 283 is under the control of a multiplex rate clock 285 which regulates the rate of switching of the inputs from the oscillators 281 and 282 to thus determine the rate, or speed, of the multiplexing action.

Figure 13:
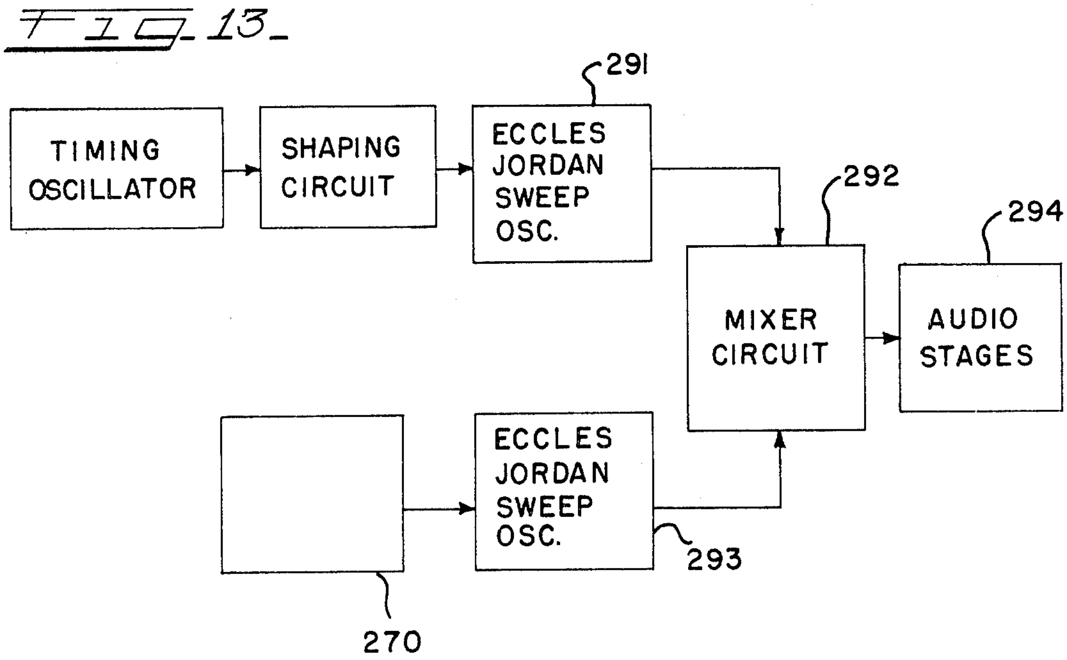
FIGS. 13 and 14 are block diagrams of modified versions of the invention similar in some respects to the arrangements of FIGS. 11 and 12 in that the circuitry arrangements of FIGS. 4 through 8 are adapted to be used in any combination thereof with a plurality of Eccles Jordan sweep oscillators and their outputs combined in a multiplexer, or mixer, circuit.
Figure 14:
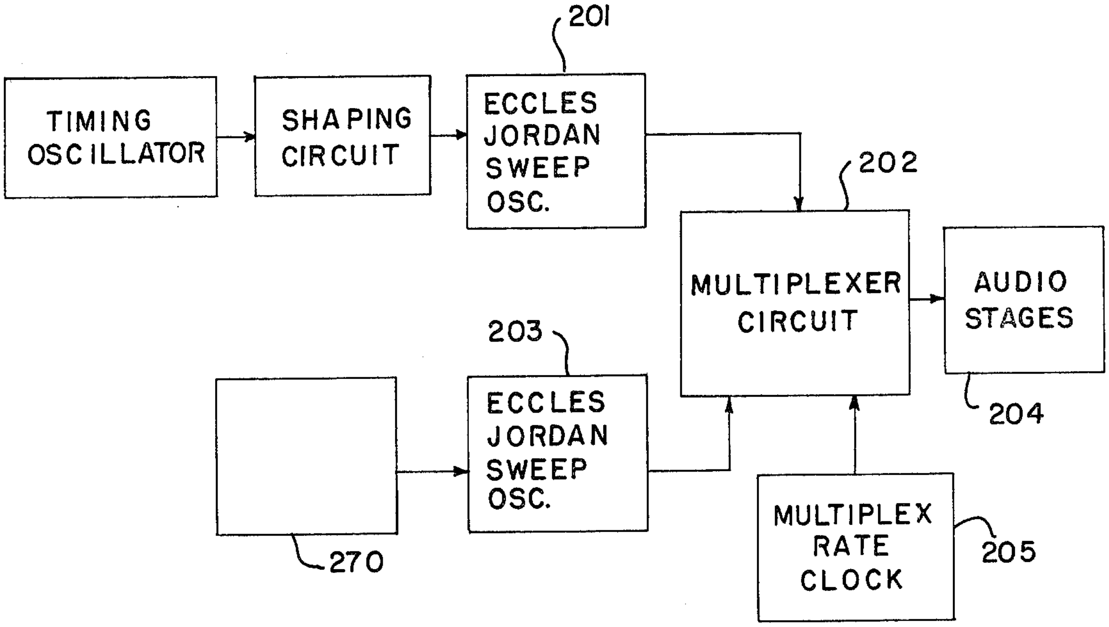

FIGS. 13 and 14 are concerned with the mixing and multiplexing of a complex audio signal with a simple audio signal. In the circuitry of FIG. 13, an Eccles Jordan sweep oscillator 291 delivers its output to a mixer circuit 292 while an Eccles Jordan sweep oscillator 293, counterpart to the Eccles Jordan sweep oscillator 17 of FIGS. 4–7, or similar oscillator 151 of FIG. 8, also delivers its output to the mixer circuit 292. The mixer circuit, of course, then delivers its output to the audio stages 294. In FIG. 14 the Eccles Jordan sweep oscillator 201 delivers its output to a multiplexer circuit 202 while the Eccles Jordan sweep oscillator 203 also delivers its output to multiplexer circuit 202 which thence delivers to the audio stages 204. A multiplex rate clock 205 regulates the switching of the inputs from the sweep oscillators 201 and 203 and thereby determine the speed, or rate, of the multiplexing action.

Figures 15, 16:
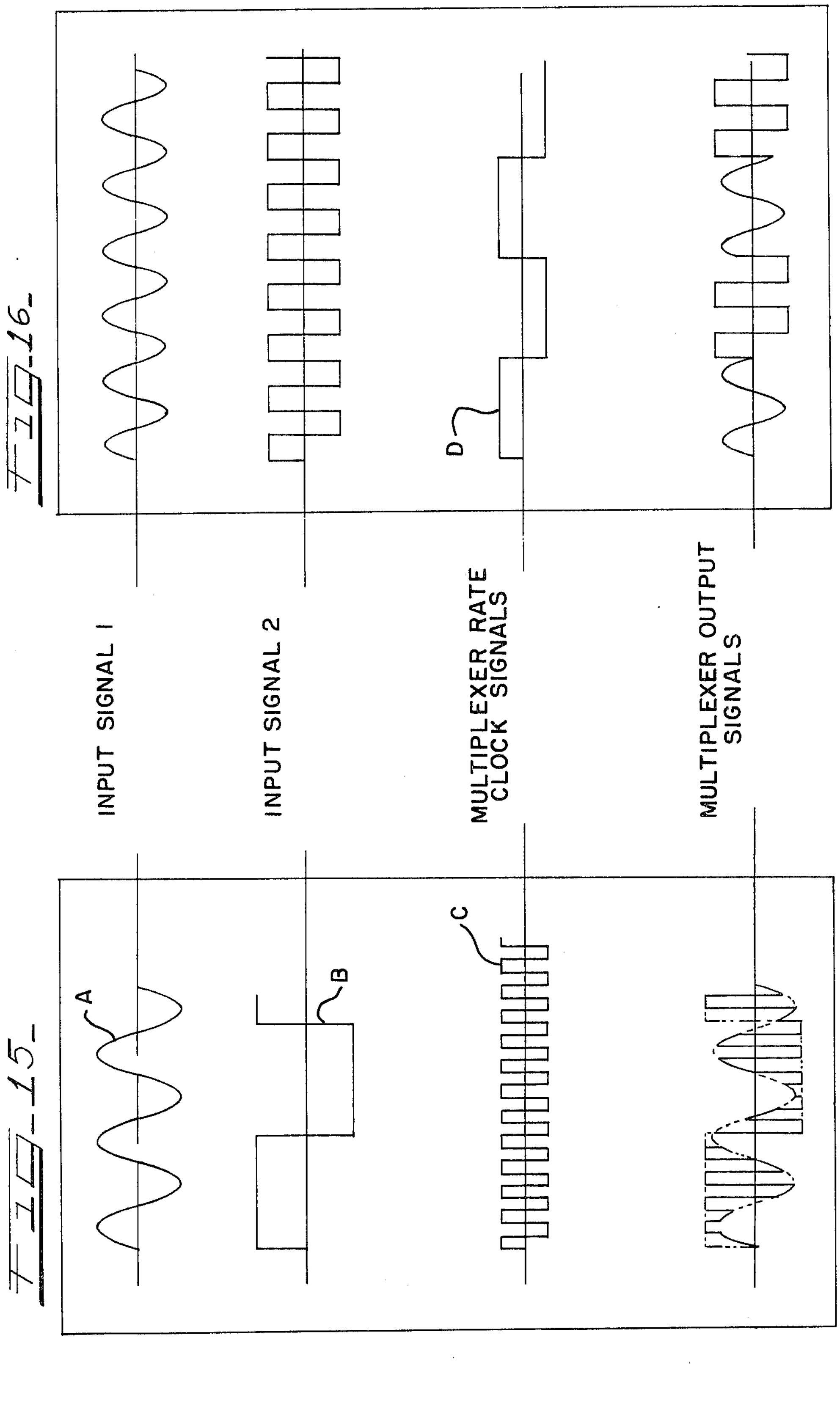
FIGS. 15 and 16 illustrate two examples of multiplexing a sine wave signal and a square wave signal illustrating the input signals and the output signals.

In FIGS. 15 and 16 different examples of multiplexing a sine wave signal and a square wave signal which have been chosen for the purpose of illustration. As indicated in FIG. 15 the multiplex rate clock signal is of higher frequency than signal A or signal B so that the output wave form generally resembles the two original signals superimposed one on the other. The higher the frequency of the multiplex rate clock the greater the output waves will resemble the two input waves superimposed one on the other.

The illustration of FIG. 16 shows a multiplex rate clock signal which is of lower frequency than either of the two input signals C and D so that the resultant wave form reflects the switching action, back and forth, between wave forms rather than a superimposition of the waves. Depending of course, on the wave forms and frequencies being multiplexed this method of "mixing" can also give the impression of two separate tones sounding simultaneously. In this Figure the dotted lines indicate the part of the input signals which are missing in the multiplexed output.

By the present concept the original idea of modulating, or mixing, multiple shaped D.C. wave forms and controlling an Eccles Jordan sweep oscillator, as represented by the arrangement illustrated in FIGS. 1 through 7, the invention now contemplates the inclusion of the mixing, or multiplexing, of the complex audio outputs of multiple Eccles Jordan sweep oscillators.

FINAL SUMMARY

From the foregoing, it will be seen that an electronic siren system has been provided wherein an audio section of the electronic circuitry produces a slowly rising and falling variable pulsed sound level in accordance with frequencies developed in a basic electronic circuit. As the major sound frequency increases during the cycle of sound, minor variations in pitch occur. The occurence of these minor variations becomes more rapid as the major sound frequency increase and less rapid as the major sound frequency decreases. This provides a simulation of the pulsing of the mechanically driven baffling, the actuation of which reoccurs at a rate corresponding to the variable rotating speed of the siren drive.

It will be seen that the present invention, by the arrangement and circuitry illustrated in FIGS. 4 through 7, provides an electronic siren having a greater number of sound sequences and wherein the sound sequences upon reoccurence can be changed to appear random, or of distinctly different nature. By the addition of the variable rate oscillator 14[a] in the circuit arrangements of FIGS. 5 and 6, the development of a greatly increased number of sound sequences has been made possible and a more complicated wave form is obtained from the modulator 16.

By the arrangements of the circuitry illustrated in FIGS. 8 through 14 the invention provides a multiplexer and associated clock circuitry as a mixing means to create a complex signal which is delivered as the input to an Eccles Jordan sweep oscillator as well as utilizing multiple Eccles Jordan oscillators with the associated Eccles Jordan input circuitry and mixing and/or multiplexing means to combine the audio outputs of the oscillators. These arrangement also utilize the mixing or multiplexing means in combination with any of the circuitry arrangements shown in FIGS. 4–7.

By the use of the present multiplexing system to combine, superimpose, add, mix, etc., various signals from audio sweep oscillators the invention utilizes the most practical method of achieving the mixing of a plurality of audio signals. This involves sampling each signal for a given time period and then combining their outputs sequentially which gives the audible impression of simultaneous sounds even though true audio mixing may not be present.

By the circuitry shown in FIGS. 8 through 14 the invention combines the outputs from a plurality of Eccles Jordan sweep oscillators by mixing means whereby various signals from the audio sweep oscillators are combined, superimposed, added, mixed, or, multiplexed.

What is claimed is:

1. An electronic siren system including a first timing oscillator and a shaping network, a second timing oscillator and a shaping network, a mixing means, and first and second sweep oscillators, said first and second timing oscillators and shaping networks directing their respective outputs to the respective first and second sweep oscillators, and said sweep oscillators directing their outputs to said mixing means, said mixing means combining the audio outputs from the respective sweep oscillators and delivering the combined output to an audio stage.

2. An electronic siren system as set forth in claim 1 wherein said mixing means comprises a multiplexer.

3. An electronic siren system as set forth in claim 2 wherein a multiplex rate clock regulates the multiplexing action of said multiplexer.

4. An electronic siren system as set forth in claim 1 wherein each of said sweep oscillators is in a separate circuit including a timing oscillator and a second oscillator, and said shaping networks are disposed in said circuits.

5. An electronic siren system as set forth in claim 3 wherein each of said sweep oscillators is disposed in a separate circuit including a timing oscillator and a variable oscillator, and said shaping networks are disposed in said circuits.

6. An electronic siren system as set forth in claim 1 wherein one of said sweep oscillators is in a separate circuit including a timing oscillator and a second oscillator, said shaping network associated with said one sweep oscillator being disposed in said separate circuit.

7. An electronic siren system as set forth in claim 6 wherein said mixing means comprises a multiplexer.

8. An electronic siren system as set forth in claim 7 wherein a multiplex rate clock regulates the multiplexing action of said multiplexer.

* * * * *